United States Patent
Hugosson et al.

(10) Patent No.: US 10,652,563 B2
(45) Date of Patent: *May 12, 2020

(54) PARALLEL PARSING IN A VIDEO DECODER

(71) Applicant: ARM Limited, Cambridge (GB)

(72) Inventors: Ola Hugosson, Lund (SE); Dominic Hugo Symes, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,624

(22) Filed: Nov. 26, 2018

(65) Prior Publication Data

US 2019/0098324 A1 Mar. 28, 2019

Related U.S. Application Data

(63) Continuation of application No. 12/929,639, filed on Feb. 4, 2011, now Pat. No. 10,165,291.

(51) Int. Cl.
*H04N 19/436* (2014.01)
*H04N 19/44* (2014.01)
*H04N 19/172* (2014.01)

(52) U.S. Cl.
CPC ......... *H04N 19/436* (2014.11); *H04N 19/172* (2014.11); *H04N 19/44* (2014.11)

(58) Field of Classification Search
None
See application file for complete search history.

(56) References Cited

U.S. PATENT DOCUMENTS

| 7,617,515 B1 | 11/2009 | Laksono |
| 10,165,291 B2 | 12/2018 | Hugosson et al. |

(Continued)

FOREIGN PATENT DOCUMENTS

EP 1 519 585 3/2005

OTHER PUBLICATIONS

Chen et al., "The Emerging MVC Standard for 3D Video Services," EURASIP Journal on Advances in Signal Processing, vol. 2009, Article ID 786015. (Year: 2009).*

(Continued)

*Primary Examiner* — Christopher Braniff
(74) *Attorney, Agent, or Firm* — Nixon & Vanderhye P.C.

(57) ABSTRACT

A video decoder configured to decode an encoded video bitstream comprises a first parsing unit and a second parsing unit, each configured to independently parse the encoded video bitstream to derive parsing state information therefrom on which subsequent parsing of the encoded video bitstream at least partially depends and to identify macroblock information for decoding. The encoded video bitstream comprises frame header information defining a sequence of frames and each frame is composed of macroblocks represented by macroblock information. A control unit of the video encoder allocates each frame of macroblock information to one of the two parsing units to parse. The two parsing units are both configured to parse frame header information to thereby each derive parsing state information for the encoded video bitstream, and the two parsing unit are each configured to parse macroblock information allocated to them, skipping macroblock information allocated to the other parsing unit.

16 Claims, 5 Drawing Sheets

(56) References Cited

U.S. PATENT DOCUMENTS

| | | |
|---|---|---|
| 2008/0089412 A1 | 4/2008 | Ugur et al. |
| 2008/0107184 A1 | 5/2008 | Katsavounidis et al. |
| 2008/0215817 A1 | 9/2008 | Nonogaki et al. |
| 2010/0046637 A1 | 2/2010 | Raveendran |
| 2010/0098157 A1 | 4/2010 | Yang |
| 2010/0142618 A1 | 6/2010 | Pandit |
| 2010/0284468 A1 | 11/2010 | Hayashi |

OTHER PUBLICATIONS

Nam et al., "Parallel Parsing of MPEG Video in Heterogeneous Distributed Environment," HSNMC 2003, pp. 264-274, 2003. (Year: 2003).*

Search Report dated Apr. 30, 2010 in GB Application 1001850.5, 3 pages.

Bhandarkar et al., "Parallel Parsing of MPEG Video", Department of Computer Science, The University of Georgia Athens, Georgia, U.S., IEEE, Oct. 2001, pp. 444-451.

Meenderinck et al., "Parallel Scalability of Video Decoders", J Sign Process Syst, Published with open access at Springerlink.com, Jul. 23, 2008, 22 pages.

Azevedo et al., "Parallel H.264 Decoding on an Embedded Multicore Processor", Delft University of Tchnology, Delft, the Netherlands, NXP, Eindhoven, the Netherlands, Technical University of Catalonia (UPC), Barcelona, Spain, Barcelona Supercomputing Center (BSC), Barcelona, Spain, Jan. 2009, 15 pages.

Meenderinck et al., "Parallel Scalability of H.264" Delft University of Technology, Delft, the Netherlands, Technical University of Catalonia (UPC), Barcelona, Spain, Barcelona Supercomputing Center (BSC), Barcelona, Spain, Jan. 2008, 12 pages.

Willner et al, "Mobile 3D Video Using MVC and N800 Internet Tablet" 3DTV-CON 2008, May 28-30, 2008, Istanbul, Turkey, 4 pages.

Vetro et al, "Joint Draft 6.0 on MultiView Video Coding" JVT-Z209, Joint Video Team (JVT) of ISO/IEC MPEG & ITU-T VCEG (ISO/IEC JTC1/SC29/WG11 and ITU-T SG16 Q.6), 26$^{th}$ Meeting, Antalya, Turkey, Jan. 13-18, 2008, 41 pages.

Ugur et al, "Parallel Encoding-Decoding Operation for Multiview Video Coding with High Coding Efficiency" 3DTV Conference, May 7-9, 2007, Kos Island, 4 pages.

Bhandarkar et al, "Parallel Parsing of MPEG Video in a Multi-threaded Multiprocessor Environment" IPDPS 2000 Workshops, 2000, 8 pages.

Nam et al, "Parallel Parsing of MPEG Video in Heterogeneous Distributed Environment" HSNMC 2003, pp. 264-274, 2003.

Chen et al, "The Emerging MVC Standard for 3D Video Services" EURASIP Journal on Advances in Signal Processing, vol. 2009, Article ID 786015, 13 pages.

UK Examination Report dated May 28, 2015 in GB 1001850.5, 2 pages.

\* cited by examiner

PARALLEL PARSING IN A VIDEO DECODER

This application is a continuation of U.S. application Ser. No. 12/929,639, filed Feb. 4, 2011, now U.S. Pat. No. 10,165,291, which claims priority to GB Application No. 1001850.5, filed Feb. 4, 2010, the entire contents of each of which are incorporated herein by reference in this application.

BACKGROUND

The present invention relates to the decoding of an encoded video bitstream, and in particular to the parsing of that encoded video bitstream.

Contemporary video compression codecs allow high quality video to be greatly compressed, such that it may be conveniently transmitted or stored, before being decoded for subsequent display. Nevertheless, despite the great advances made in video compression technology, the continual drive towards ever higher quality of video means that high bandwidth transmissions of video data are commonplace. For example, high definition video at 1080p30 may require a bandwidth of between 8 Mbits/s (at relatively low quality) to around 45 Mbits/s (at high definition TV quality).

Various techniques are implemented to achieve the high levels of compression necessary to transmit high quality video data, such as entropy coding (e.g. context-adaptive binary arithmetic coding (CABAC) and variable length coding (VLC)). These techniques require the use of a bitstream parser to translate coded elements of the bitstream into a format which can be decoded into displayable video data. For example, a typical space saving technique when encoding video data is to translate commonly seen bit sequences into shorter codes representing those bit sequences. When such a bitstream is received at a video decoder one of the first steps required is to translate these codes back into the original bit sequences. Furthermore, parsing the bitstream enables the video decoder to identify the structure of the video bitstream, for example, where each frame begins and ends and the macroblocks that belong to each frame, such that those macroblocks may be decoded. It is also known to increase coding density by providing that the parsing of a given frame depends on the result of parsing a previous frame.

Various techniques for improving decoding performance are known. Firstly, it is known to provide dedicated hardware for each component of a video decoder which is optimised in terms of performance. However, this approach is costly to design and can be power hungry. Secondly, it is known to decode independent slices (consecutive sequences of macroblocks within a frame) in parallel by making use of multi-threading techniques. However, the ability to do this in the decoder depends on the slice format provided by the encoder, and in many real-world situations it is desirable that a video decoder does not impose any such constraints on the video encoder.

Some papers which look at the parallelisation of video decoding are: A. Azevedo et al., "Parallel H.264 Decoding on an Embedded Multicore Processor," in Proceedings of the 4th International Conference on High Performance and Embedded Architectures and Compilers—HIPEAC, January 2009; C. H. Meenderinck et al., "Parallel Scalability of H.264", in Proceedings of the first Workshop on Programmability Issues for Multi-Core Computers, 2008; and "Parallel Scalability of Video Decoders", Journal of Signal Processing Systems, Springer—New York, Vol. 57 No. 2, November 2009, pp. 173-194. It will be recognised that these papers focus on the opportunities for the parallelisation of decoding at the full decode level.

Accordingly, it would be desirable to provide a technique which enabled a video decoder to increase the bitstream rate it can handle (consequently allowing a higher quality of video to be handled), without relying on expensive and power hungry dedicated hardware in the decoder, and furthermore without imposing requirements on the output of the encoder.

SUMMARY

Viewed from a first aspect, the present invention provides a video decoder configured to decode an encoded video bitstream, said video decoder comprising: a first parsing unit and a second parsing unit, said first parsing unit and said second parsing unit configured to independently parse said encoded video bitstream to derive parsing state information therefrom on which subsequent parsing of said encoded video bitstream at least partially depends and to identify macroblock information for decoding; and a control unit configured to control operation of said first parsing unit and said second parsing unit, wherein said encoded video bitstream comprises frame header information and macroblock information, said frame header information defining a sequence of frames and each frame is composed of macroblocks represented by said macroblock information, said control unit configured to allocate each frame of macroblock information to one of said first parsing unit and said second parsing unit, wherein said first parsing unit and said second parsing unit are both configured to parse said frame header information to thereby each derive said parsing state information for said encoded video bitstream, and wherein said first parsing unit and said second parsing unit are each configured to parse said macroblock information, skipping macroblock information allocated to the other parsing unit.

According to the techniques of the present invention, a video decoder is provided which comprises a first parsing unit and a second parsing unit, wherein each parsing unit is configured to independently parse the encoded video bitstream and to derive parsing state information therefrom on which subsequent parsing of the encoded video bitstream at least partially depends. Furthermore the parsing units identify macroblock information for decoding. A control unit controls the operation of the first parsing unit and the second parsing unit.

The encoded video bitstream comprises frame header information and macroblock information, each frame comprising a number of macroblocks. In operation both parsing units independently parse the frame header information in the encoded video bitstream thus each deriving the parsing state information for the encoded video bitstream, but at the macroblock level the video decoder's control unit allocates each frame of macroblock information to either the first parsing unit or the second parsing unit. Hence, when parsing the encoded video bitstream each parsing unit is configured to parse the frame header information and the macroblock information from frames that have been allocated to it. Macroblock information allocated to the other parsing unit is skipped. However, by providing that each parsing unit parses all frame header information, each parsing unit can maintain a full set of parsing state information, such that any dependencies reliant on that parsing state information can be resolved in either parsing unit.

The inventors of the present invention realised that a significant increase in the bitstream rate that can be handled by a video decoder may be achieved by parallelising the bitstream parsing process in this way. On the one hand, by providing two parsing units the speed of the parse process is almost doubled, meaning that a corresponding doubling of the number of bits per macroblock is possible. On the other hand, because only an extra parsing unit has been added to the video decoder, the increase in power consumption and silicon area required is modest. Since both the first parsing unit and second parsing unit parse all frame header information in the video bitstream, each is able to maintain a full parsing decode state entirely independently of the other. In addition, since the vast majority of data in a video bitstream is comprised in the macroblock layer, the allocation of the parsing of the macroblock information of each frame to either the first parsing unit or the second parsing unit means that the speed of the parse process may be nearly doubled.

The macroblock information identified by the parsing units may be handled in a number of ways. In one embodiment, said video decoder further comprises a sequence of decoding units configured to decode said macroblock information identified by said first parsing unit and said second parsing unit to generate displayable video data. This sequence of decoding units may be variously configured, but a typical set of such dedicated decoding units may comprise a motion compensator, an intra-predictor, a de-quantiser, a inverse discrete cosine transformer and a deblocker. In another embodiment, said first parsing unit and said second parsing unit are further configured to decode said macroblock information to generate displayable video data. Hence the entire decoding process may be handled in parallel by each of the parsing units, each decoding the macroblocks allocated to it by the video decoder into displayable video data.

It will be appreciated that the control unit of the decoder could be hard-wired such that the control of the parsing units is predetermined, but in some embodiments said control unit is configured to control operation of said first parsing unit and said second parsing unit with reference to control data. Hence the manner in which the parsing units are controlled is readily reconfigurable, providing advantageous flexibility.

Whilst the video decoder may only comprise two parsing units, in some embodiments said video decoder further comprises at least one further parsing unit, said at least one further parsing unit also configured to parse said frame header information to thereby derive said parsing state information for said encoded video bitstream, wherein said video encoder is configured to allocate each frame of macroblock information to one of said first parsing unit, said second parsing unit and said at least one further parsing unit, and wherein said first parsing unit, said second parsing unit and said at least one further parsing unit are each configured to skip macroblock information allocated to another parsing unit.

Thus it will be appreciated that the techniques of the present invention are not only applicable to two parsing units, but rather further parsing units may be added in order to further increase the speed of the parsing process. Accordingly in such an arrangement all parsing units parse the frame header information to each derive the parsing state information, but the video encoder allocates each frame of macroblock information to one of the first, second, third (etc.) parsing units. Thus each parsing unit will only parse macroblock information allocated to it, and will skip macroblock information allocated to another parsing unit. The addition of further parsing units in this way enables still further increases in the speed of the parsing process to be attained, although ultimately the addition of such further parsing units is limited by power-consumption constraints, silicon-area constraints and so on.

In some embodiments, said encoded video bitstream further comprises slice header information, said slice header information defining at least one slice in each frame, said at least one slice comprising a consecutive sequence of macroblocks, wherein said first parsing unit and said second parsing unit are configured to both parse said slice header information. Each frame of the encoded video bitstream may further be divided into slices, each slice having slice header information defining that slice. Both the first and second parsing unit are configured to parse the slice header information, such that each maintains a full set of parsing state information, even though any particular slice may be allocated to the other parsing unit as part of a frame allocated to that parsing unit.

In some embodiments, said encoded video bitstream comprises video sequence header information, said video sequence header information defining configuration parameters of said encoded video bitstream, wherein said first parsing unit and said second parsing unit are configured to both parse said video sequence header information. The encoded video bitstream may further comprise video sequence header information such as sequence parameter sets (SPS) and picture parameter sets (PPS). Such information provides high level configuration parameters for the encoded video, such as frame size, frame rate and so on. Each parsing unit parses this video sequence header information in order to maintain a full set of parsing state information.

Whilst the first and second parsing unit could be arranged to perform their parsing operations directly in parallel to one another, in some embodiments said first parsing unit and said second parsing unit are configured to parse said encoded video bitstream temporally offset from one another. This temporal offset between the parsing operations of the first and second parsing units may have a number of advantages, for example in one embodiment said first parsing unit is configured to perform macroblock parsing with reference to prior results of macroblock parsing performed by said second parsing unit, and said second parsing unit is configured to perform macroblock parsing with reference to prior results of macroblock parsing performed by said first parsing unit. The ability for each parsing unit to refer to the prior results of macroblock parsing performed by the other parsing unit may be useful, for example in the case where B frames are being parsed. B frames have a co-located frame data dependency which typically refers to the previous frame, a given macroblock in a present B frame having such a parsing data dependency to the macroblock at the same physical location in the previous frame. By temporally offsetting the parsing operations of the first and second parsing units, it may be provided that the results of macroblock parsing in one parsing unit are available for the other parsing unit. Given that such data dependencies refer to a macroblock at the same physical location in a previous frame, the temporal offset between the parsing operations of the first and second parsing units need not be great, it being sufficient for the corresponding previous macroblock to have been parsed and the relevant information stored in system memory before the other parsing unit accesses it.

In one embodiment said first parsing unit and said second parsing unit are configured to resolve data dependencies between macroblocks in a second pass of each frame. It is possible for the afore-mentioned data dependencies between macroblocks to be resolved in a second pass of each frame. In other words, the fact that such a data dependency exists may be established in a first processing pass of each frame, and the data dependency may only be fully resolved on a second processing pass of the frame.

In some embodiments said control unit is configured to allocate a next frame of macroblock information to a first available parsing unit, said first available parsing unit being either said first parsing unit or said second parsing unit. Whilst it is possible for the video decoder to be configured to allocate each frame of macroblock information strictly alternately to the first parsing unit and second parsing unit, it may be advantageous to allocate the next frame of macroblock information in the encoded video bitstream to whichever parsing unit happens to be available next. For example, if there is variation in the size of the frames, it may be the case that if the first parsing unit is allocated a large frame, the second parsing unit may finish parsing a subsequent frame, whilst the first parsing unit is still parsing that large frame. It may then be desirable to allocate the next frame to the second parsing unit, thus avoiding a period of inactivity before the next frame would otherwise be allocated to that second parsing unit.

In some embodiments, said first parsing unit and said second parsing unit are configured to schedule their respective parsing in dependence on a type of video frame indicated by said frame header information. The scheduling requirements of the first and second parsing unit can depend on the type of video frame currently being handled. Only B frames exhibit the co-located frame data dependency to a previous frame described above, whilst I and P frames have no such dependencies. Consequently it may be desirable to schedule the respective parsing of the first and second parsing units accordingly, for example whilst the two parsing units may be allowed to operate directly in parallel to one another whilst parsing I and P frames, when B frames are encountered, it may be required to briefly delay the operation of one parsing unit in order to allow the consequent data dependencies to be handled.

In some embodiments said first parsing unit and said second parsing unit are further configured to perform motion vector prediction. Motion vector prediction commonly forms one of the techniques used by the video encoder to enable a high degree of data compression in the encoded video bitstream to be achieved. Furthermore, according to some video codecs, it is a required part of the parsing process that motion vector prediction is carried out.

In some embodiments said first parsing unit and said second parsing unit are further configured to perform content dependent parsing. It may be the case that the parsing that is required is itself dependent on the content of the encoded video bitstream. For example, a particular coding in the bitstream may need to be parsed differently in dependence on the outcome of a previous parsing operation. This allows even greater coding density in the encoded video bitstream to be achieved.

Viewed from a second aspect, the present invention provides a method of decoding an encoded video bitstream, said method comprising the steps of: parsing said encoded video bitstream using a first parsing unit and a second parsing unit, each parsing unit configured to independently derive parsing state information from said encoded video bitstream on which subsequent parsing of said encoded video bitstream at least partially depends and to identify macroblock information for decoding, wherein said encoded video bitstream comprises frame header information and macroblock information, said frame header information defining a sequence of frames and each frame being composed of macroblocks represented by said macroblock information, wherein said parsing step comprises parsing said frame header information in both said first parsing unit and said second parsing unit such that each derives said parsing state information for said encoded video bitstream; and allocating each frame of macroblock information to one of said first parsing unit and said second parsing unit, wherein said first parsing unit and said second parsing unit are each configured to parse said macroblock information, skipping macroblock information allocated to the other parsing unit.

Viewed from a third aspect the present invention provides a video decoder configured to decode an encoded video bitstream, said video decoder comprising: first parsing means and second parsing means, said first parsing means and said second parsing means for independently parsing said encoded video bitstream to derive parsing state information therefrom on which subsequent parsing of said encoded video bitstream at least partially depends and to identify macroblock information for decoding; and control means for controlling operation of said first parsing means and said second parsing means, wherein said encoded video bitstream comprises frame header information and macroblock information, said frame header information defines a sequence of frames and each frame being composed of macroblocks represented by said macroblock information, said control means configured to allocate each frame of macroblock information to one of said first parsing means and said second parsing means, wherein said first parsing means and said second parsing means are configured to both parse said frame header information to thereby each derive said parsing state information for said encoded video bitstream, and wherein said first parsing means and said second parsing means are each configured to parse said macroblock information, skipping macroblock information allocated to the other parsing means.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
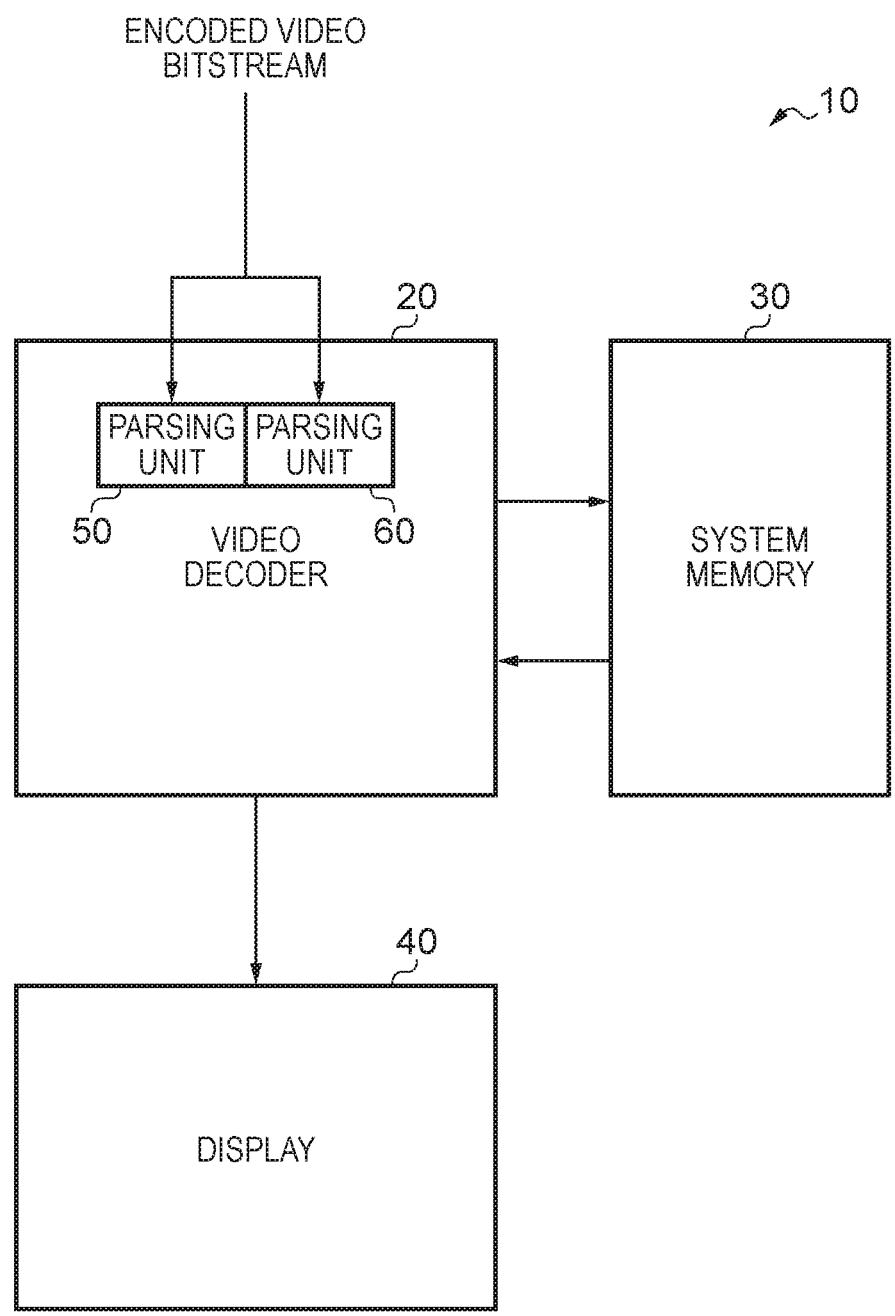
FIG. 1 schematically illustrates a video system receiving an encoded video bitstream and decoding it for display.

FIG. 1 schematically illustrates a video decoding apparatus 10, which is configured to receive an encoded video bitstream and to decode that encoded video bitstream for display. The video system comprises video decoder 20, system memory 30 and display 40. Video decoder 20 comprises various components which enable it to receive the encoded video bitstream and to output decoded video data for display on display unit 40. Further description of some of these components of video decoder 20 is made below with reference to FIG. 3, but for the present purposes it is sufficient to note that video decoder 20 comprises two parsing units 50 and 60. The encoded video bitstream received by video decoder 20 is received by both parsing unit 50 and parsing unit 60. In performing its video decoding operations, the video decoder 20 makes use of system memory 30 to store and retrieve data processed as part of those video decoding operations.

Figure 2A:
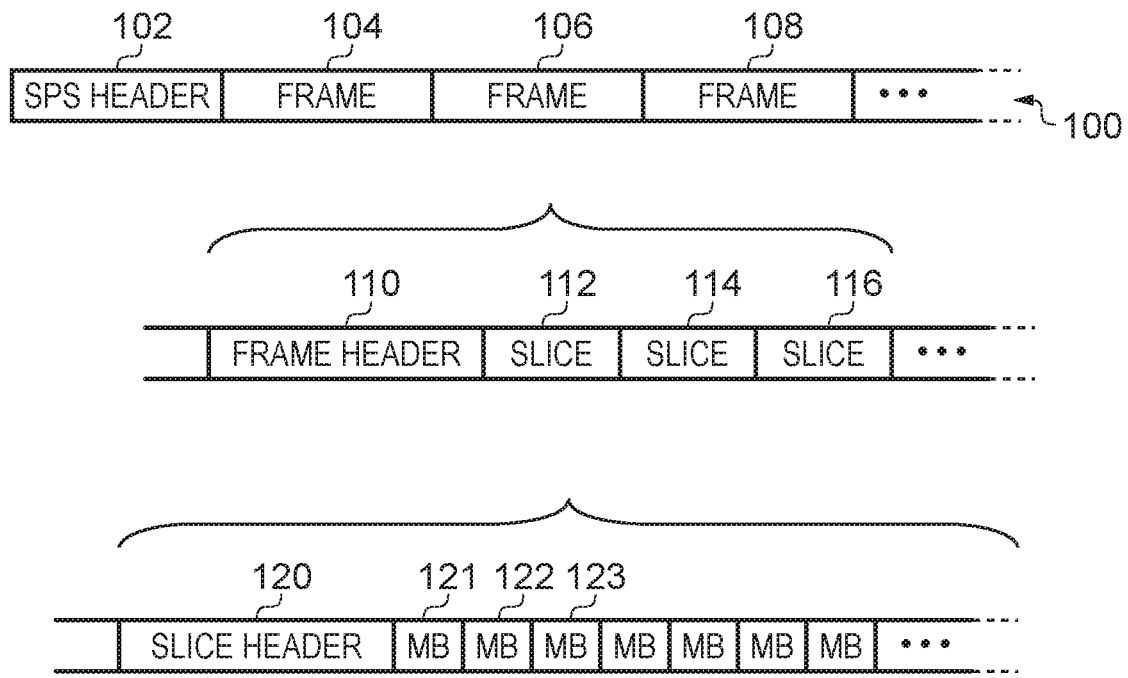
FIG. 2A schematically illustrates a frame-slice-macroblock hierarchy in an encoded video bitstream.

The hierarchical structure of the encoded video bitstream received by video decoder 20 is schematically illustrated in FIG. 2A. At the highest level of the hierarchy the encoded video bitstream 100 comprises header information (e.g. sequence parameter set (SPS) header 102) and a sequence of frames of encoded video 104, 106, 108 and so on. At the next (middle) level of the hierarchy, each frame (e.g. frame 106) comprises a frame header 110 followed by a series of slices 112, 114 and 116 and so on. The slices divide each frame up into a series of contiguous macroblocks in raster scan order. At the next (lowest) level of the hierarchy each slice (e.g. slice 112) comprises a slice header 120 followed by a series of macroblocks 121, 122, 123 and so on.

At each level of the hierarchical structure of the encoded video bitstream, the header information gives control information which may not only be required to interpret that level of the hierarchy, but may also be necessary for the correct parsing of lower levels in the hierarchy (where such lower levels exist). For example, SPS header 102 gives information about the overall structure of the sequence of frames that follow it, and furthermore may give information necessary for the correct parsing of a lower level of the hierarchy, such as the macroblock information 121, 122, 123 and so on. The frame header information 110 similarly provides information about the frame to which it belongs (in this example frame 106) and furthermore parsing of frame header information 110 may be necessary for correct parsing at the macroblock level. Finally, at the lowest level of the illustrated hierarchy, the slice header (e.g. 120) gives information about the slice to which it belongs (in this case slice 112), and correct parsing of the slice header information may be necessary in order to correctly parse the macroblock information.

Figure 2B:
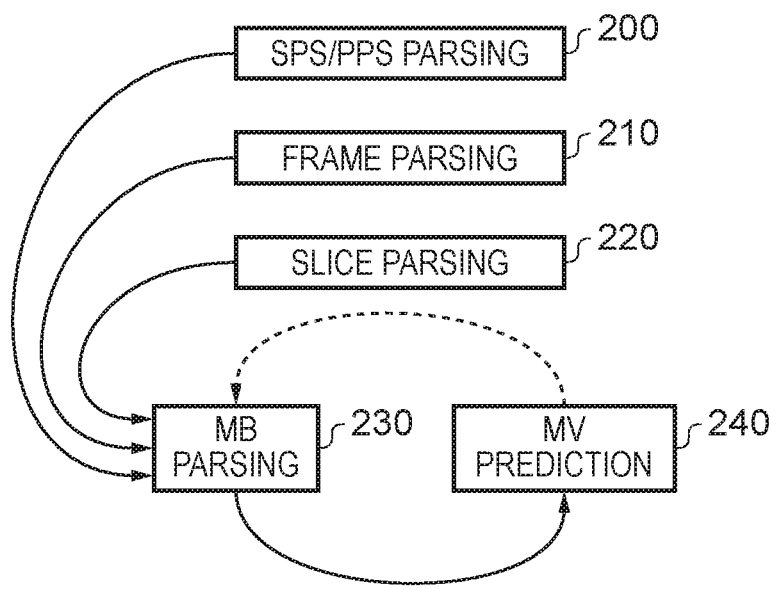
FIG. 2B schematically illustrates the parsing hierarchy for the encoded video bitstream of FIG. 2A.

The manner in which control information in the headers at each level of the illustrated hierarchical structure of the encoded video bitstream is necessary to perform parsing of information lower in the hierarchy is schematically illustrated in FIG. 2B. Here it can be seen that parsing happens at various levels, namely SPS/PPS parsing 200, frame parsing 210, slice parsing 220 and macroblock (MB) parsing 230. Also illustrated in FIG. 2B is motion vector (MV) prediction 240 which also occurs at the level of the macroblock parsing 230. Motion vector prediction 240 is the process of generating a predicted motion vector for each macroblock. Due to the typically strong correlation between the motion vectors of spatially adjacent macroblocks, in contemporary video codecs it is common for encoding efficiency is gained by only encoding a difference between a present macroblock motion vector and the previous macroblock motion vector. This difference will typically require much less coding space than a motion vector itself.

The dependencies between the parsing processes in FIG. 2B are illustrated by the solid arrows. In other words, information from the higher parsing levels 200, 210 and 220 is required for the macroblock parsing at 230 to be correctly carried out. Similarly, macroblock parsing 230 is required for motion vector prediction 240 to be carried out. In some video codecs the macroblock parsing 230 and motion vector prediction 240 are even more tightly coupled, and there exist dependencies from motion vector prediction 240 to macroblock parsing 230 (illustrated by the dashed arrow in FIG. 2B). In such a situation it is necessary for the macroblock parsing 230 and the motion vector parsing 240 to be carried out in association with one another to allow the dependencies from one to the other to be resolved.

Figure 3:
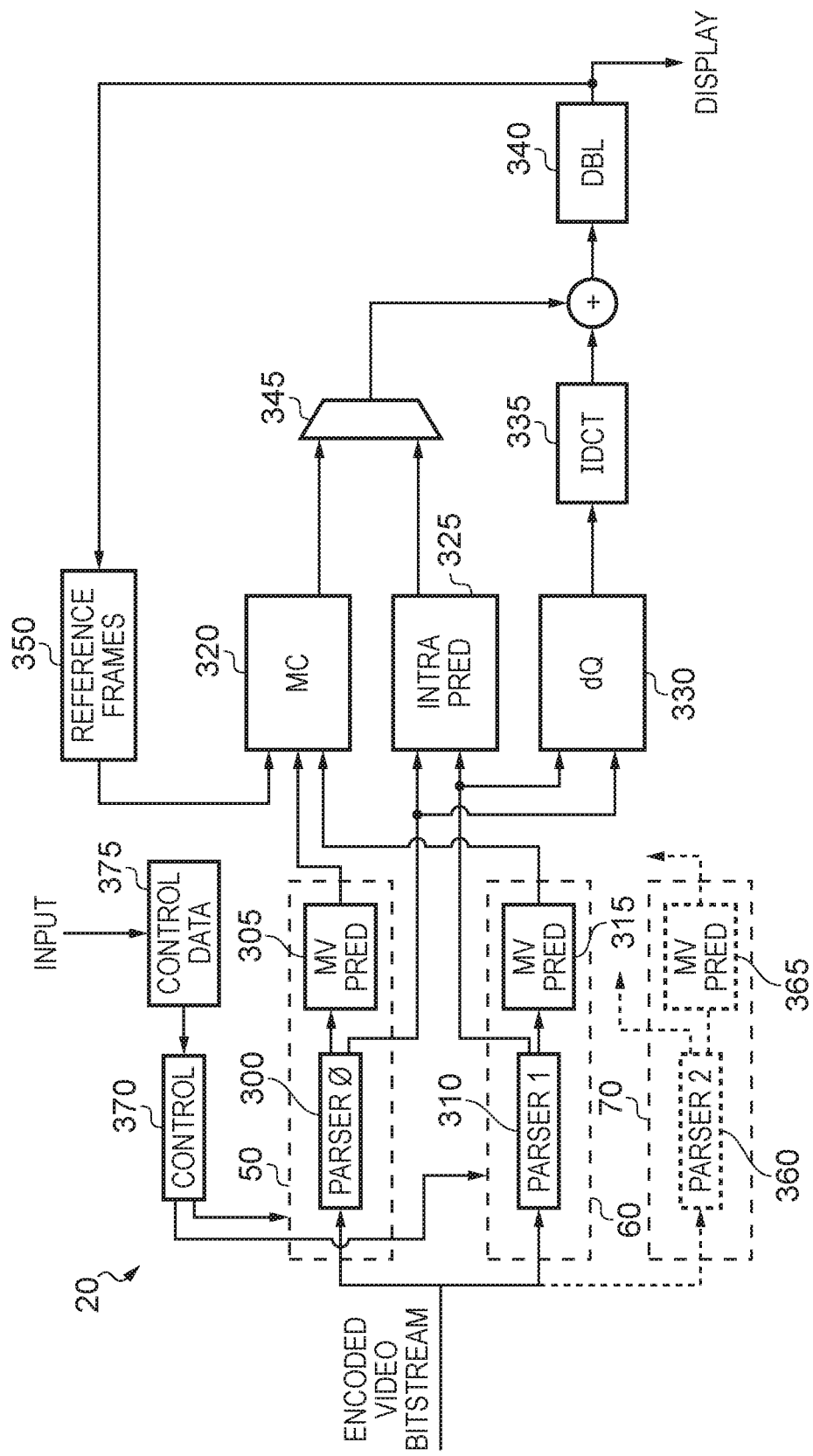
FIG. 3 schematically illustrates the components of a video decoder.

FIG. 3 schematically illustrates in more detail some of the components of video decoder 20 (see FIG. 1) in one embodiment. Video decoder 20 comprises two parsing units 50 and 60, which each comprise a parser and a motion vector (MV) predictor. Parsing unit 50 comprises parser 300 and MV predictor 305, whilst parsing unit 60 comprises parser 310 and MV predictor 315. The encoded video bitstream is received by both parser 300 and parser 310, which are each configured to parse all control information contained in the encoded video bitstream (i.e. all header information). Parsing units 50 and 60 also comprise motion vector predictors 305 and 315 respectively, which are configured to calculate a predicted motion vector for each macroblock. Control of the operation of parsing units 50 and 60 is provided by control unit 370, which itself is configured in dependence on control data stored in control data storage unit 375. The control data in control data storage unit 375 may be fixed and immutable, but the illustrated embodiment is more flexible, allowing the control data to be updated via an input.

The remaining components of the video decoder 20 illustrated in FIG. 3 comprise a sequence of decoding units configured to decode the macroblocks identified by the parsing operations of parsing units 50 and 60. These decoding units include motion compensator (MC) 320, intra-predictor 325, de-quantiser 330, inverse discrete cosine transformer (IDCT) 335 and deblocker 340. Also illustrated is the multiplexer 345 which selects between the outputs of the motion compensator 320 (for inter-predicted macroblocks) and the output of intra-predictor 325 (for intra-predictive macroblocks). The output of deblocker 340 is also written back to memory in the form of reference frames 350, which are subsequently used by motion compensator 320. It should be understood that the illustration in FIG. 3 shows how the processing of the information contained in the encoded video bitstream is handled by the various components of the video decoder 20, and is not a strict representation of data transfers in the decoder. Typically, components of the video decoder will make use of the system memory 30 (as illustrated in FIG. 1) to read data for processing and to write back processed data. The next component in the process will then retrieve from memory the data processed at the previous step and perform its own processing thereon.

According to the illustrated embodiment, a classic sequence of decoding units has been replaced by one in which two initial parsing units are provided in parallel. Each of these parsing units 50 and 60 receives the entire encoded video bitstream and parses all control information. However, the video decoder 20 (by means of control unit 370) is configured to allocate macroblock information on a frame-by-frame basis to one parsing unit or the other. Hence, by parsing all control information, each parsing unit is able to maintain a full set of parsing state information, but will skip (i.e. read, but not parse) macroblocks allocated to the other parsing unit. Since macroblock information forms the majority of the encoded video bitstream, this technique enables the speed of the parse process to be almost doubled. Each parsing unit 50 and 60 will write macroblock information and packed residuals for each frame into the system memory, such that the subsequent full decoding of these parsed frames may be carried out.

Note that also illustrated in FIG. 3 (by means of dashed lines) is a further parsing unit 70, comprising a further parser 360 and a further motion vector predictor 365. For clarity the onward connections of this further parsing unit 70 (to MC 320, intra-predictor 325 and de-quantiser 330 in the same fashion as for parsing units 50 and 60), as well as an incoming connection from control unit 370, have been omitted for clarity. The addition of this further parsing unit enables the video decoder 20 to further increase the speed of the parse process, by control unit 370 now allocating macroblock information for parsing on a frame-by-frame basis to one of three parsing units, namely parsing unit 50, 60 or parsing unit 70. In principle, although not illustrated, a fourth (or more) parsing unit could be added, to further increase the speed of the parse process.

In another embodiment, the parsing units 50 and 60 are each configured to perform the full decoding of the macroblocks. In this embodiment, the roles of motion compensator (MC) 320, intra-predictor 325, de-quantiser 330, inverse discrete cosine transformer (IDCT) 335 and deblocker 340 are performed by functionality provided within each of parsing units 50 and 60.

Figure 4A:
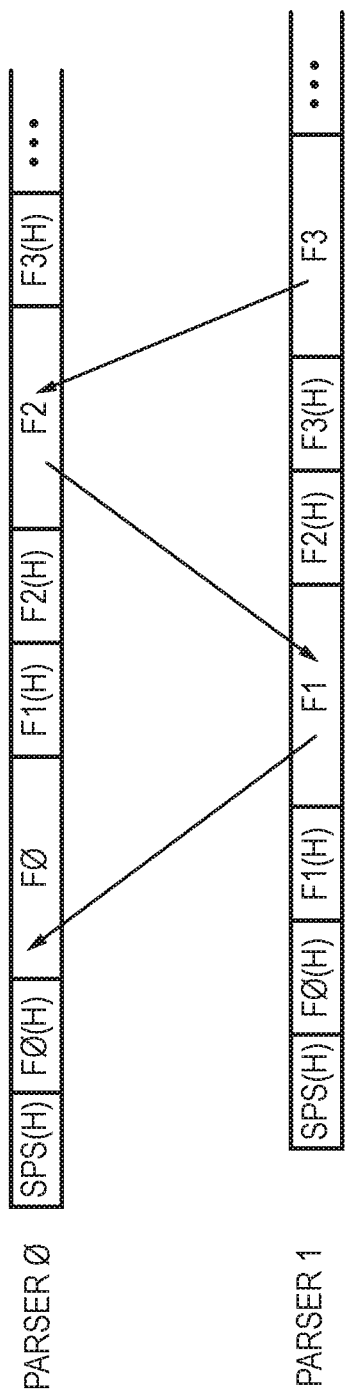
FIG. 4A schematically illustrates the parsing operations of two parsing units.

The parsing units 50 and 60 may operate directly in parallel to one another, but there are situations, as illustrated in FIG. 4A, when it is advantageous for them to operate at a small temporal offset. For some frames (B frames) video encoding efficiency is gained by introducing a parsing dependency between frames, such that in order to correctly parse a later frame, reference to previously parsed earlier frame is necessary. This is illustrated in FIG. 4A where frame 1 (F1) is dependent on frame 0 (F0), frame 2 (F2) is dependent on F1, and frame 3 (F3) is dependent on F2. Using only a single parsing unit, these dependencies would be resolved with reference to previously parsed frames in the system memory, the sequential nature of the frames allowing this to happen. However, in order to parallelise this parsing process, an offset in time between the operations of the first parsing unit and the second parsing unit is necessary, so that, for example, data from F0 is available in the system memory by the time the parsing unit parsing F1 requires it. These frame dependencies are a "co-located frame data dependency", meaning that a macroblock in a later frame will depend on a macroblock in an earlier frame at the same spatial location within the frame. Hence, in order for these co-located frame data dependencies to be resolved, it is sufficient for the first parsing unit to operate only slightly ahead of the second parsing unit, such that a given macroblock in each frame is already parsed and written to system memory by the time the second parsing unit starts parsing that co-located macroblock. In an alternative embodiment, the parsing units 50 and 60 may operate in parallel to one another, despite there being data dependencies that require resolution, wherein the parsing units are configured to resolve data dependencies between macroblocks in a second pass of each frame. In other words, each frame is handled twice by its respective parser, in a first pass any data dependencies being identified, and in a second pass those identified data dependencies being resolved.

FIG. 4A also illustrates how each parsing unit parses all header information, but only alternate frames at the macroblock level (i.e. within a given frame). Hence, each parsing unit parses the SPS header information (SPS (H)), and the header information for each frame (F0(H), F1(H), . . . ). However, when parser 1 reads the next byte after F0(H) it recognises that this is the first byte of a macroblock of frame 0 and skips this macroblock without parsing it. Similarly, parser 0 skips the macroblock layer for frame 1 (and all subsequent odd numbered frames).

Figure 4B:
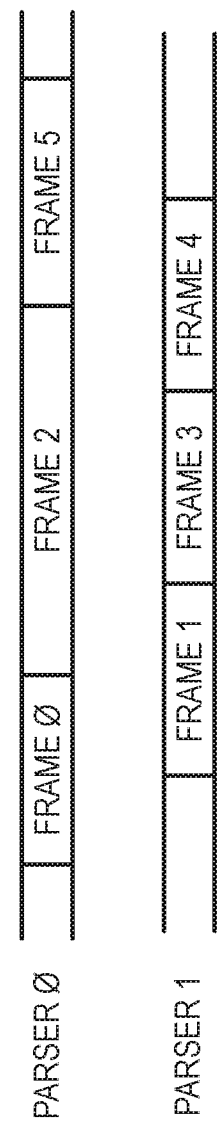
FIG. 4B schematically illustrates the dynamic scheduling of two parsing units.

Whilst a strictly alternating scheduling of the parsers, such as is illustrated in FIG. 4A is possible, there are situations in which it is advantageous for the scheduling of the parsers to be dynamic. FIG. 4B illustrates one such situation in which an unusually large frame (e.g. containing a great level of detail not easily predictable from other frames) is encountered by parser 0. The result of this can be seen in the figure, namely that parser 0 is still parsing frame 2 when parser 1 has finished parsing frame 3. If a strictly alternating schedule were followed, parser 1 would then have to wait until parser 0 had completed both the ongoing frame 2 and the subsequent frame 4. However, by dynamically scheduling the allocation of frames to the parsing units, parser 1 is able to immediately start parsing frame 4 when it completes frame 3. When parser 0 completes frame 2, it is then allocated frame 5. The parsers may then continue in this fashion, with parser 0 parsing odd frames and parser 1 parsing even frames, but further switches are of course possible if more unusually sized frames are encountered.

It is also possible for the dynamic scheduling of the parsers to be dependent on the type of frames currently being parsed. The above-described temporal offset between the parsers is only necessary if B frames are being parsed. If I or P frames are being parsed, the video decoder may be configured to switch to parallel operation of the parsers.

Figure 5:
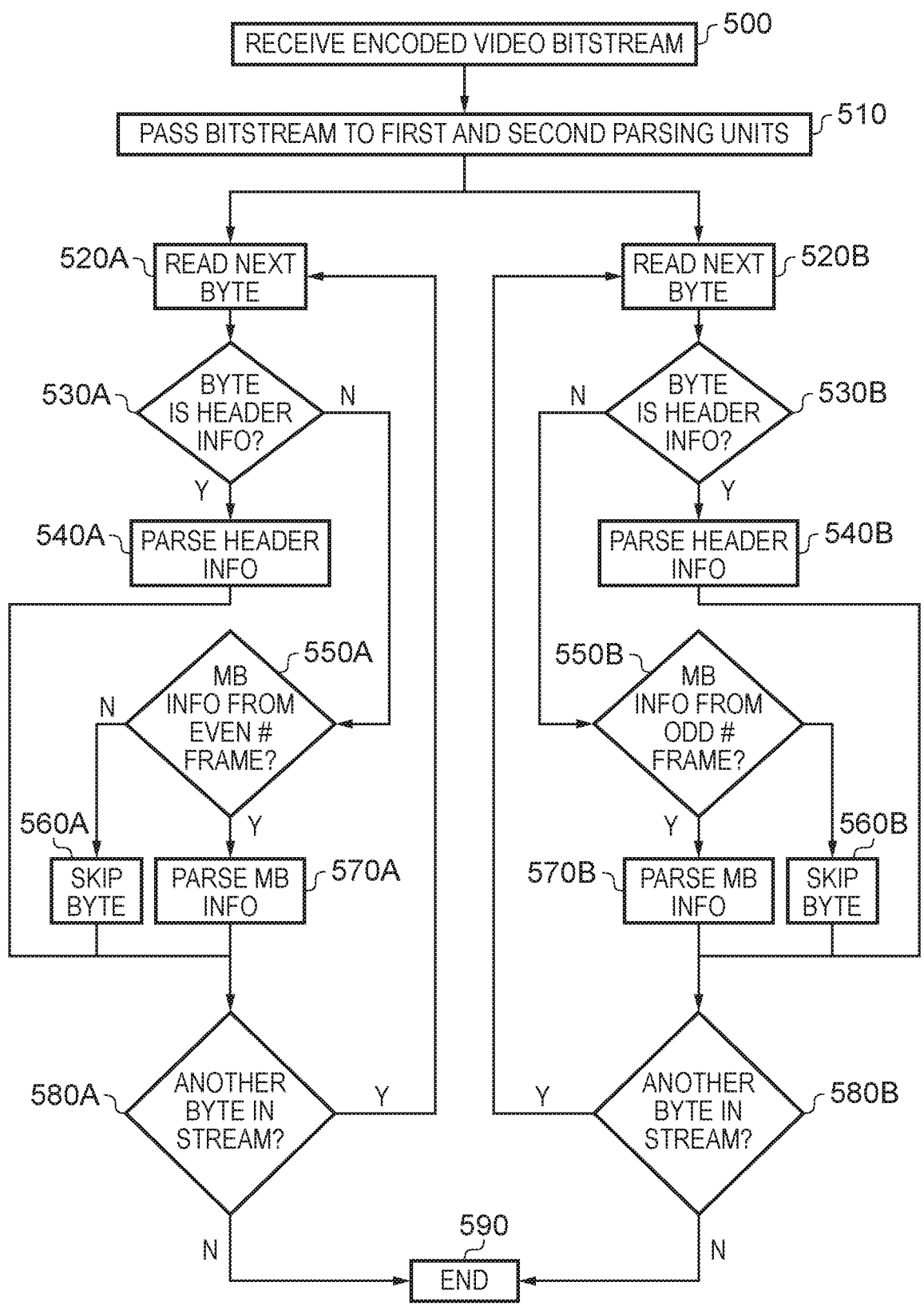
FIG. 5 schematically illustrates a series of steps taken in one embodiment.

FIG. 5 schematically illustrates a series of steps taken by first parsing unit 50 and second parsing unit 60 in video decoder 20. At step 500 video decoder 20 receives the encoded video bitstream and at step 510 it passes the encoded video bitstream to both first and second parsing units 50 and 60. The flow then proceeds by two parallel stages (one in each parsing unit). Each parsing unit reads the next byte of the bitstream at step 520A/B and at step 530A/B it is determined if the current byte is header information or not. If the byte is header information, then at step 540A/B the header information is parsed by the parsing units and the flow proceeds to step 580A/B (described below). If at step 530A/B it is determined that the byte is not header information (i.e. it is macroblock information), then at step 550A/B it is determined whether the macroblock information is from an even numbered frame or from an odd numbered frame. If the macroblock information is from an even numbered frame, then the byte will be parsed at step 570A by the first parsing unit and skipped at step 560B by the second parsing unit. If the macroblock information is from an odd numbered frame then the byte will be parsed at step 570B by the second parsing unit and will be skipped by the first parsing unit at step 560A. The flow then proceeds to step 580A/B where it is determined if there is another byte in the stream. If there is, the flow returns to step 520A/B. If there is no further byte to be parsed (i.e. the bitstream has ended) the flow concludes at step 590. It will be appreciated with reference to FIG. 4A that the parallel steps in FIG. 5 may not proceed directly in parallel with one another but the operation of one parsing unit could be delayed with respect to the other, to allow for the data dependencies discussed with reference to FIG. 4A.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video decoder configured to decode an encoded video bitstream, said video decoder comprising:

a first parsing unit and a second parsing unit, said first parsing unit and said second parsing unit configured to independently parse said encoded video bitstream to derive a full set of parsing state information therefrom on which subsequent parsing of said encoded video bitstream at least partially depends and to identify macroblock information for decoding; and a control unit configured to control operation of said first parsing unit and said second parsing unit, wherein said encoded video bitstream comprises frame header information and macroblock information, said frame header information defines a sequence of frames and each frame is composed of macroblocks represented by said macroblock information, said control unit configured to allocate each frame of macroblock information to one of said first parsing unit and said second parsing unit, wherein said first parsing unit and said second parsing unit are both configured to parse said frame header information to thereby each derive and maintain said full set of parsing state information for said encoded video bitstream, and wherein said first parsing unit and said second parsing unit are each configured to parse said macroblock information, skipping macroblock information allocated to the other parsing unit.

2. A video decoder as claimed in claim 1, wherein said video decoder further comprises a sequence of decoding units configured to decode said macroblock information identified by said first parsing unit and said second parsing unit to generate displayable video data.

3. A video decoder as claimed in claim 1, wherein said first parsing unit and said second parsing unit are further configured to decode said macroblock information to generate displayable video data.

4. A video decoder as claimed in claim 1, wherein said control unit is configured to control operation of said first parsing unit and said second parsing unit with reference to control data.

5. A video decoder as claimed in claim 1, wherein said video decoder further comprises at least one further parsing unit, said at least one further parsing unit also configured to parse said frame header information to thereby derive said full set of parsing state information for said encoded video bitstream, wherein said video encoder is configured to allocate each frame of macroblock information to one of said first parsing unit, said second parsing unit and said at least one further parsing unit, and wherein said first parsing unit, said second parsing unit and said at least one further parsing unit are each configured to skip macroblock information allocated to another parsing unit.

6. A video decoder as claimed in claim 1, wherein said encoded video bitstream further comprises slice header information, said slice header information defining at least one slice in each frame, said at least one slice comprising a consecutive sequence of macroblocks, wherein said first parsing unit and said second parsing unit are configured to both parse said slice header information.

7. A video decoder as claimed in claim 1, wherein said encoded video bitstream comprises video sequence header information, said video sequence header information defining configuration parameters of said encoded video bitstream, wherein said first parsing unit and said second parsing unit are configured to both parse said video sequence header information.

8. A video decoder as claimed in claim 1, wherein said first parsing unit and said second parsing unit are configured to parse said encoded video bitstream temporally offset from one another.

9. A video decoder as claimed in claim 8, wherein said first parsing unit is configured to perform macroblock parsing with reference to prior results of macroblock parsing performed by said second parsing unit, and said second parsing unit is configured to perform macroblock parsing with reference to prior results of macroblock parsing performed by said first parsing unit.

10. A video decoder as claimed in claim 1, wherein said first parsing unit and said second parsing unit are configured to resolve data dependencies between macroblocks in a second pass of each frame.

11. A video decoder as claimed in claim 1, wherein said control unit is configured to allocate a next frame of macroblock information to a first available parsing unit, said first available parsing unit being either said first parsing unit or said second parsing unit.

12. A video decoder as claimed in claim 1, wherein said first parsing unit and said second parsing unit are configured to schedule their respective parsing in dependence on a type of video frame indicated by said frame header information.

13. A video decoder as claimed in claim 1, wherein said first parsing unit and said second parsing unit are further configured to perform motion vector prediction.

14. A video decoder as claimed in claim 1, wherein said first parsing unit and said second parsing unit are further configured to perform content dependent parsing.

15. A method of decoding an encoded video bitstream, said method comprising the steps of:

parsing said encoded video bitstream using a first parsing unit and a second parsing unit, each parsing unit independently deriving a full set of parsing state information from said encoded video bitstream on which subsequent parsing of said encoded video bitstream at least partially depends and to identify macroblock information for decoding, wherein said encoded video bitstream comprises frame header information and macroblock information, said frame header information defining a sequence of frames and each frame being composed of macroblocks represented by said macroblock information, wherein said parsing step comprises parsing said frame header information in both said first parsing unit and said second parsing unit such that each derives and maintains said full set of parsing state information for said encoded video bitstream; and allocating each frame of macroblock information to one of said first parsing unit and said second parsing unit, wherein said first parsing unit and said second parsing unit each parse said macroblock information, skipping macroblock information allocated to the other parsing unit.

16. A video decoder configured to decode an encoded video bitstream, said video decoder comprising:

first parsing means and second parsing means, said first parsing means and said second parsing means for independently parsing said encoded video bitstream to derive a full set of parsing state information therefrom on which subsequent parsing of said encoded video bitstream at least partially depends and to identify macroblock information for decoding; and control means for controlling operation of said first parsing means and said second parsing means, wherein said encoded video bitstream comprises frame header information and macroblock information, said frame header information defines a sequence of frames and each frame is composed of macroblocks represented by said macroblock information, said control means configured to allocate each frame of macroblock information to one of said first parsing means and said second parsing means, wherein said first parsing means and said second parsing means are configured to both parse said frame header information to thereby each derive and maintain said full set of parsing state information for said encoded video bitstream, and wherein said first parsing means and said second parsing means are each configured to parse said macroblock information, skipping macroblock information allocated to the other parsing means.

* * * * *